United States Patent
Wisniewski et al.

(10) Patent No.: US 10,248,467 B2
(45) Date of Patent: Apr. 2, 2019

(54) CODE EXECUTION REQUEST ROUTING

(71) Applicant: Amazon Technologies, Inc., Seattle, WA (US)

(72) Inventors: Scott Daniel Wisniewski, Edmonds, WA (US); Marc John Brooker, Seattle, WA (US); Timothy Allen Wagner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/912,273

(22) Filed: Mar. 5, 2018

(65) Prior Publication Data

US 2018/0210760 A1    Jul. 26, 2018

Related U.S. Application Data

(63) Continuation of application No. 14/977,544, filed on Dec. 21, 2015, now Pat. No. 9,910,713.

(51) Int. Cl.
*G06F 9/455*   (2018.01)
*G06F 9/50*    (2006.01)

(52) U.S. Cl.
CPC ........ *G06F 9/5055* (2013.01); *G06F 9/45558* (2013.01); *G06F 9/5027* (2013.01); *G06F 9/5077* (2013.01); *G06F 2009/4557* (2013.01); *G06F 2009/45562* (2013.01); *G06F 2209/5011* (2013.01); *G06F 2209/5013* (2013.01)

(58) Field of Classification Search
CPC ....... G06F 9/45533; G06F 2009/45562; G06F 2009/45583; G06F 11/1484; G06F 13/14
See application file for complete search history.

(56) References Cited

U.S. PATENT DOCUMENTS

| | | | | |
|---|---|---|---|---|
| 5,283,888 A | * | 2/1994 | Dao | G06F 3/16 709/237 |
| 9,052,935 B1 | * | 6/2015 | Rajaa | G06F 9/5033 |
| 2009/0300599 A1 | * | 12/2009 | Piotrowski | G06F 21/53 717/174 |
| 2010/0122343 A1 | * | 5/2010 | Ghosh | G06F 21/55 726/23 |
| 2011/0141124 A1 | * | 6/2011 | Halls | G06F 21/83 345/522 |
| 2012/0054744 A1 | * | 3/2012 | Singh | G06F 21/53 718/1 |
| 2013/0191924 A1 | * | 7/2013 | Tedesco | G06F 21/00 726/26 |
| 2013/0198319 A1 | * | 8/2013 | Shen | G06F 9/5077 709/217 |

(Continued)

*Primary Examiner* — Dong U Kim
(74) *Attorney, Agent, or Firm* — Knobbe, Martens, Olsen & Bear, LLP

(57) ABSTRACT

A system for providing low-latency compute capacity is provided. The system may be configured to route incoming code execution requests based on user indications to use specific containers running on a plurality of virtual machine instances. The system may be configured to process a code execution request, identify, based on the user indication that a specific container previously used to handle a request of similar type is to be used for handling the code execution request, and cause the code execution request to be handled using the specific container.

17 Claims, 6 Drawing Sheets

(56) References Cited

U.S. PATENT DOCUMENTS

| | | | |
|---|---|---|---|
| 2013/0227710 A1* | 8/2013 | Barak | G06F 21/10 |
| | | | 726/29 |
| 2013/0232480 A1* | 9/2013 | Winterfeldt | G06F 8/60 |
| | | | 717/177 |
| 2014/0059552 A1* | 2/2014 | Cunningham | G09G 5/00 |
| | | | 718/102 |
| 2014/0108722 A1* | 4/2014 | Lipchuk | G06F 12/08 |
| | | | 711/113 |
| 2015/0046926 A1* | 2/2015 | Kenchammana-Hosekote | G06F 9/45533 |
| | | | 718/1 |
| 2015/0142952 A1* | 5/2015 | Bragstad | H04L 41/5019 |
| | | | 709/224 |
| 2015/0188775 A1* | 7/2015 | Van Der Walt | G06F 3/0481 |
| | | | 715/734 |
| 2016/0098285 A1* | 4/2016 | Davis | G06F 9/45545 |
| | | | 718/1 |
| 2016/0350099 A1* | 12/2016 | Suparna | G06F 8/65 |

* cited by examiner

US 10,248,467 B2

CODE EXECUTION REQUEST ROUTING

RELATED APPLICATION

This application is a continuation of U.S. application Ser. No. 14/977,544, filed Dec. 21, 2015 and titled "CODE EXECUTION REQUEST ROUTING," the disclosure of which is hereby incorporated by reference in its entirety.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
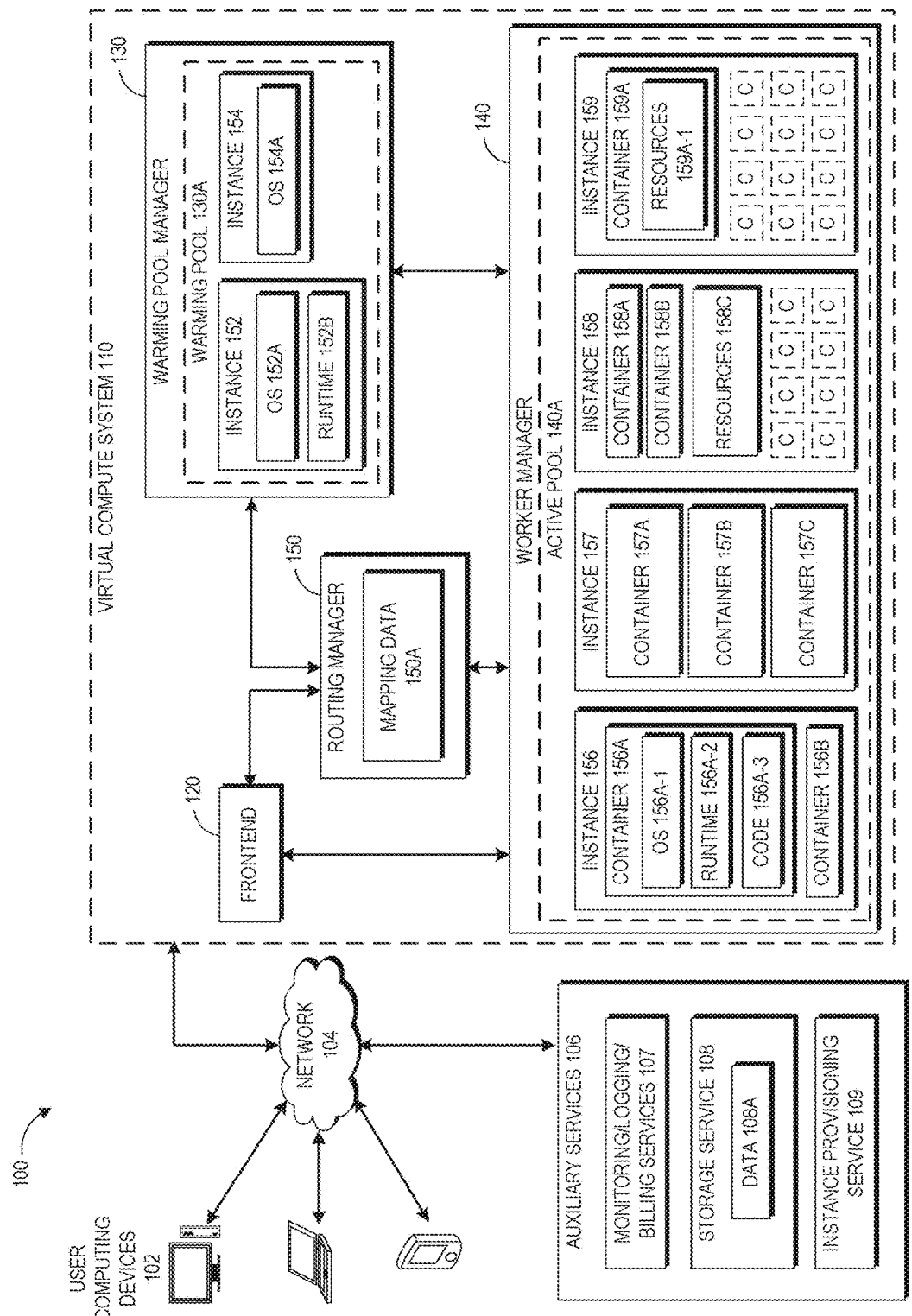
FIG. 1 is a block diagram depicting an illustrative environment for providing low latency compute capacity, according to an example aspect.

Companies and organizations no longer need to acquire and manage their own data centers in order to perform computing operations (e.g., execute code, including threads, programs, functions, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines are software implementations of physical machines (e.g., computers), which are hosted on physical computing devices, and may contain operating systems and applications that are traditionally provided on physical machines. These virtual machine instances are configured with a set of computing resources (e.g., memory, CPU, disk, network, etc.) that applications running on the virtual machine instances may request and can be utilized in the same manner as physical computers.

However, even when virtual computing resources are purchased, developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds.

According to aspects of the present disclosure, by maintaining a pool of pre-initialized virtual machine instances that are ready for use as soon as a user request is received, and automatically managing the amount of capacity available in the pool to service incoming requests, delay (sometimes referred to as latency) associated with executing the user code (e.g., instance and language runtime startup time) can be significantly reduced, and utilization can be improved.

Generally described, systems and methods are disclosed which facilitate management of virtual machine instances in a virtual compute system. The virtual compute system maintains a pool of virtual machine instances that have one or more software components (e.g., operating systems, language runtimes, libraries, etc.) loaded thereon. Maintaining the pool of virtual machine instances may involve creating a new instance, acquiring a new instance from an external instance provisioning service, destroying an instance, assigning/reassigning an instance to a user, modifying an instance (e.g., containers or resources therein), etc. The virtual machine instances in the pool can be designated to service user requests to execute program codes. In the present disclosure, the phrases "program code," "user code," and "cloud function" may sometimes be interchangeably used. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

In another aspect, a virtual compute system may create and manage a mapping between incoming code execution requests received by the virtual compute system and the compute capacity used to handle those code execution requests. The mapping may facilitate use and reuse of certain container-specific resources by multiple requests. For example, a given container may be associated with a cache that stores code execution results and may be accessed by any program code executed in the given container. Accordingly, once the code execution result associated with a request is stored in the cache, subsequent requests of the same type, if routed to the given container, may be handled more efficiently using the code execution results stored in the cache. Thus, by routing the requests to the appropriate containers running on the virtual compute system, latency gains may be achieved.

Specific embodiments and example applications of the present disclosure will now be described with reference to the drawings. These embodiments and example applications are intended to illustrate, and not limit, the present disclosure.

Illustrative Environment Including Virtual Compute System

With reference to FIG. 1, a block diagram illustrating an embodiment of a virtual environment 100 will be described. The example shown in FIG. 1 includes a virtual environment 100 in which users (e.g., developers, etc.) of user computing devices 102 may run various program codes using the virtual computing resources provided by a virtual compute system 110.

By way of illustration, various example user computing devices 102 are shown in communication with the virtual compute system 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The virtual compute system 110 may provide the user computing devices 102 with one or more user interfaces, command-line interfaces (CLI), application programing interfaces (API), and/or other programmatic interfaces for generating and uploading user codes, invoking the user codes (e.g., submitting a request to execute the user codes on the virtual compute system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the virtual compute system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The virtual compute system 110 is depicted in FIG. 1 as operating in a distributed computing environment including several computer systems that are interconnected using one or more computer networks. The virtual compute system 110 could also operate within a computing environment having a fewer or greater number of devices than are illustrated in FIG. 1. Thus, the depiction of the virtual compute system 110 in FIG. 1 should be taken as illustrative and not limiting to the present disclosure. For example, the virtual compute system 110 or various constituents thereof could implement various Web services components, hosted or "cloud" computing environments, and/or peer-to-peer network configurations to implement at least a portion of the processes described herein.

Further, the virtual compute system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the virtual environment 100 includes a virtual compute system 110, which includes a frontend 120, a warming pool manager 130, a worker manager 140, and a routing manager 150. In the depicted example, virtual machine instances ("instances") 152, 154 are shown in a warming pool 130A managed by the warming pool manager 130, and instances 156, 157, 158, 159 are shown in an active pool 140A managed by the worker manager 140. In some embodiments, the term "virtual machine instance" may refer to an execution of software or other executable code that emulates hardware to provide an environment or platform on which software may execute (an "execution environment"). Virtual machine instances are generally executed by physical hardware devices, which may differ from the hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a single device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, are known within the art.

The illustration of the various components within the virtual compute system 110 is logical in nature and one or more of the components can be implemented by a single computing device or multiple computing devices. For example, the instances 152, 154, 156, 157, 158, 159 can be implemented on one or more physical computing devices in different various geographic regions. Similarly, each of the frontend 120, the warming pool manager 130, the worker manager 140, and the routing manager 150 can be implemented across multiple physical computing devices. Alternatively, one or more of the frontend 120, the warming pool manager 130, the worker manager 140, and the routing manager 150 can be implemented on a single physical computing device. In some embodiments, the virtual compute system 110 may comprise multiple frontends, multiple warming pool managers, multiple worker managers, and/or multiple capacity managers. Although six virtual machine instances are shown in the example of FIG. 1, the embodiments described herein are not limited as such, and one skilled in the art will appreciate that the virtual compute system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the virtual compute system 110 may comprise any number of warming pools and active pools.

In the example of FIG. 1, the virtual compute system 110 is illustrated as being connected to the network 104. In some embodiments, any of the components within the virtual compute system 110 can communicate with other components (e.g., the user computing devices 102 and auxiliary services 106, which may include monitoring/logging/billing services 107, storage service 108, an instance provisioning service 109, and/or other services that may communicate with the virtual compute system 110) of the virtual environment 100 via the network 104. In other embodiments, not all components of the virtual compute system 110 are capable of communicating with other components of the virtual environment 100. In one example, only the frontend 120 may be connected to the network 104, and other components of the virtual compute system 110 may communicate with other components of the virtual environment 100 via the frontend 120.

Users may use the virtual compute system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request to the virtual compute system 110. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

Frontend

The frontend 120 processes all the requests to execute user code on the virtual compute system 110. In one embodiment, the frontend 120 serves as a front door to all the other services provided by the virtual compute system 110. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the virtual compute system 110) prior to the request is received by the virtual compute system 110. The virtual compute system 110 may vary its code execution strategy based on where the code is available at the time the request is processed.

The frontend 120 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may have registered the user code with an auxiliary service 106 and specified that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. In yet another example, the frontend 120 may have a queue of incoming code execution requests, and when the user's batch job is removed from the virtual compute system's work queue, the frontend 120 may process the user request. In yet another example, the request may originate from another component within the virtual compute system 110 or other servers or services not illustrated in FIG. 1.

A user request may specify one or more third-party libraries (including native libraries) to be used along with the user code. In one embodiment, the user request is a ZIP file containing the user code and any libraries (and/or identifications of storage locations thereof). In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the virtual compute system 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the virtual compute system 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the virtual compute system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the virtual compute system 110 may inspect the request and look for the flag or the header, and if it is present, the virtual compute system 110 may modify the behavior (e.g., logging facilities) of the container in which the user code is executed, and cause the output data to be provided back to the user. In some embodiments, the behavior/mode indicators are added to the request by the user interface provided to the user by the virtual compute system 110. Other features such as source code profiling, remote debugging, etc. may also be enabled or disabled based on the indication provided in the request.

In some embodiments, the virtual compute system 110 may include multiple frontends 120. In such embodiments, a load balancer may be provided to distribute the incoming requests to the multiple frontends 120, for example, in a round-robin fashion. In some embodiments, the manner in which the load balancer distributes incoming requests to the multiple frontends 120 may be based on the state of the warming pool 130A and/or the active pool 140A. For example, if the capacity in the warming pool 130A is deemed to be sufficient, the requests may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the requests may be distributed to the multiple frontends 120 in a manner that reduces or minimizes the number of virtual machine instances taken from the warming pool 130A. For example, even if, according to a load balancing restriction, a request is to be routed to Frontend A, if Frontend A needs to take an instance out of the warming pool 130A to service the request but Frontend B can use one of the instances in its active pool to service the same request, the request may be routed to Frontend B.

Warming Pool Manager

The warming pool manager 130 ensures that virtual machine instances are ready to be used by the worker manager 140 when the virtual compute system 110 receives a request to execute user code on the virtual compute system 110. In the example illustrated in FIG. 1, the warming pool manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the virtual compute system 110 and added to the warming pool 130A. In other embodiments, the warming pool manager 130 communicates with an auxiliary virtual machine instance service (e.g., the instance provisioning service 109 of FIG. 1) to create and add new instances to the warming pool 130A. In some embodiments, the warming pool manager 130 may utilize both physical computing devices within the virtual compute system 110 and one or more virtual machine instance services to acquire and maintain compute capacity that can be used to service code execution requests received by the frontend 120. In some embodiments, the virtual compute system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the virtual compute system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the virtual compute system 110, the user interface may prompt the user to specify one of the predetermined operating conditions for executing the user code. In another example, the service-level agreement (SLA) for utilizing the services provided by the virtual compute system 110 may specify a set of conditions (e.g., programming languages, computing resources, etc.) that user requests should satisfy, and the virtual compute system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); scheduling information (e.g., the time by which the virtual compute system is requested to execute the program code, the time after which the virtual compute system is requested to execute the program code, the temporal window within which the virtual compute system is requested to execute the program code, etc.), etc.

Worker Manager

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the virtual compute system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

In the example illustrated in FIG. 1, user codes are executed in isolated compute systems referred to as containers. Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance).

As shown in FIG. 1, instances may have operating systems (OS), language runtimes, and containers. The containers may have individual copies of the OS and the language runtimes and user codes loaded thereon. In the example of FIG. 1, the active pool 140A managed by the worker manager 140 includes the instances 156, 157, 158, 159. The instance 156 has containers 156A, 156B. The container 156A has OS 156A-1, runtime 156A-2, and code 156A-3 loaded therein. In the depicted example, the container 156A has its own OS, runtime, and code loaded therein. In one embodiment, the OS 156A-1 (e.g., the kernel thereof), runtime 156A-2, and/or code 156A-3 are shared among the containers 156A, 156B (and any other containers not illustrated in FIG. 1). In another embodiment, the OS 156A-1 (e.g., any code running outside the kernel), runtime 156A-2, and/or code 156A-3 are independent copies that are created for the container 156A and are not shared with other containers on the instance 156. In yet another embodiment, some portions of the OS 156A-1, runtime 156A-2, and/or code 156A-3 are shared among the containers on the instance 156, and other portions thereof are independent copies that are specific to the container 156A. The instance 157 includes containers 157A, 157B, 157C. The instance 158 includes containers 158A, 158B and resources 158C. The instance 159 includes a container 159A and resources 159A-1. The resources 158C may be instance-specific resources such as memory, disk storage, database, etc. that are accessible by any container (or any code executed therein) created thereon. The resources 159A-1 may be container-specific resources such as memory, disk storage, database, etc. that are accessible by any code executed therein.

In the example of FIG. 1, the sizes of the containers depicted in FIG. 1 may be proportional to the actual size of the containers. For example, the container 156A occupies more space than the container 156B on the instance 156. Similarly, the containers 157A, 157B, 157C may be equally sized, and the containers 158A and 158B may be equally sized. The dotted boxes labeled "C" shown in the instances 158, 159 indicate the space remaining on the instances that may be used to create new instances. In some embodiments, the sizes of the containers may be 64 MB or any multiples thereof. In other embodiments, the sizes of the containers may be any arbitrary size smaller than or equal to the size of the instances in which the containers are created. In some embodiments, the sizes of the containers may be any arbitrary size smaller than, equal to, or larger than the size of the instances in which the containers are created. By how much the sizes of the containers can exceed the size of the instance may be determined based on how likely that those containers might be utilized beyond the capacity provided by the instance.

Although the components inside the containers 156B, 157A, 157B, 157C, 158A, 158B, 159A are not illustrated in the example of FIG. 1, each of these containers may have various operating systems, language runtimes, libraries, and/or user code. In some embodiments, instances may have user codes loaded thereon (e.g., in an instance-level cache such as the resources 158C), and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

After a request has been successfully processed by the frontend 120, the worker manager 140 finds capacity to service the request to execute user code on the virtual compute system 110. For example, if there exists a particular virtual machine instance in the active pool 140A that has a container with the same user code loaded therein (e.g., code 156A-3 shown in the container 156A), the worker manager 140 may assign the container to the request and cause the user code to be executed in the container. Alternatively, if the user code is available in the local cache of one of the virtual machine instances (e.g., stored on the instance 158 but does not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

In some embodiments, the virtual compute system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). The virtual compute system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the virtual compute system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to handle the request at the time the request is received. In some embodiments, instead of initiating the requested code execution as soon as the code execution request is received, the virtual compute system 110 may schedule the code execution according to the scheduling information provided by the request. For example, the request may specify a temporal window (e.g., between 3:00 AM to 4:00 AM next Monday) within which the virtual compute system 110 is requested to perform the code execution, and the virtual compute system 110 may schedule the code execution based on certain performance considerations (e.g., workload, latency, etc.).

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the virtual compute system 110 to perform one or more techniques described herein. Although only the storage service 108 is illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 110) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manager 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity. In some embodiments, the virtual compute system 110 may maintain a separate cache in which user codes are stored to serve as an intermediate level of caching system between the local cache of the virtual machine instances and a web-based network storage (e.g., accessible via the network 104).

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container is received, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, periodicity information (e.g., containers/instances in the active pool 140A not currently executing user code thereon can be (i) kept alive if the periodicity information indicates that additional requests are expected to arrive soon or (ii) terminated if the periodicity information indicates that additional requests are not likely to arrive soon enough to justify keeping the containers/instances alive), and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shut-down (e.g., deleted, terminated, etc.), and resources allocated thereto are released. In some embodiments, the threshold time passed before a container is torn down is shorter than the threshold time passed before an instance is torn down.

In some embodiments, the virtual compute system 110 may provide data to one or more of the auxiliary services 106 as it services incoming code execution requests. For example, the virtual compute system 110 may communicate with the monitoring/logging/billing services 107. The monitoring/logging/billing services 107 may include: a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service). In addition to the system-level activities that may be performed by the monitoring/logging/billing services 107 (e.g., on behalf of the virtual compute system 110) as described above, the monitoring/logging/billing services 107 may provide application-level services on behalf of the user code executed on the virtual compute system 110. For example, the monitoring/logging/billing services 107 may monitor and/or log various inputs, outputs, or other data and parameters on behalf of the user code being executed on the virtual compute system 110. Although shown as a single block, the monitoring, logging, and billing services 107 may be provided as separate services.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

Routing Manager

The routing manager 150 creates and manages a mapping between incoming code execution requests received by the virtual compute system 110 and the compute capacity used to handle those code execution requests. The mapping may facilitate use and reuse of certain container-specific resources by multiple requests. For example, a given container may be associated with a cache that stores code execution results and may be accessed by any program code executed in the given container. Accordingly, once the code execution result associated with a request is stored in the cache, subsequent requests of the same type, if routed to the given container, may be handled more efficiently using the code execution results stored in the cache. Although the routing manager 150 is illustrated as a distinct component within the virtual compute system 110, part or all of the functionalities of the routing manager 150 may be performed by the frontend 120, the warming pool manager 130, and/or the worker manager 140. For example, the routing manager 150 may be implemented entirely within one of the other components of the virtual compute system 110 or in a distributed manner across the other components of the virtual compute system 110. In the example of FIG. 1, the routing manager 150 includes mapping data 150A. The mapping data 150A may include data indicating how the incoming code execution requests should be routed to the containers running on the virtual compute system 110. The mapping data 150A may also include any container/routing policies specified by the users or determined by the routing manager 150 for routing the incoming requests received by the virtual compute system 110. The mapping data 150A may be stored in a storage device internal to the virtual compute system 110 and/or stored in an external storage device (e.g., storage service 108) and periodically backed up.

The routing manager 150 may include a routing parameter determination unit for determining a routing parameter associated with a given code execution request, and a container lookup unit for determining the appropriate container to be used to handle the given code execution request based on the determined routing parameter. An example configuration of the routing manager 150 is described in greater detail below with reference to FIG. 2.

Maintaining Resources Associated with Containers

In some embodiments, containers running on the virtual compute system 110 may be associated with container-specific resources such as memory, disk storage, database, etc. that are accessible by any program code executed in the containers. For example, code execution results of a program code executed in a container may be cached in local memory associated with the container. The cached results may be utilized by the virtual compute system 110 to facilitate other code execution requests of the same type (e.g., requests associated with the same program code and the same set of arguments). In one example, a user may wish to provide a weather service that allows people to type in zip codes and view the weather information associated with those zip codes. Every time a zip code is entered, a request may be sent to the virtual compute system 110 to execute a weather information lookup function (e.g., in a container created on a virtual machine instance assigned to the user) using the entered zip code. The lookup function may retrieve the weather information from a weather database using the zip code and output the retrieved weather information. The retrieved weather information may also be stored in the memory associated with the container, so that any future code execution requests can utilize the stored information. For example, if another request having the same zip code is received (e.g., within a threshold time period), the weather information lookup function may simply return the cached result without going to the weather database, thereby achieving some latency gains. Even if the current weather information is cached, if the subsequent requests are routed to a different container that cannot access the cached information, the cached information would not be available to the weather information lookup function and the latency gains could not be achieved. Additionally, or alternatively, the virtual compute system 110 may have other resources such as memory, disk storage, database, etc. accessible at the instance level (e.g., accessible by any program code executed on the particular instance or any containers thereon) and/or at the account level (e.g., accessible by any program code executed on an instance associated with the user).

Mapping Between Requests and Specific Containers

In some embodiments, the routing manager 150 processes the incoming code execution requests and determines to which containers the requests should be routed. For example, when the virtual compute system 110 receives a request associated with a given program code for the first time, there may be no mapping that routes the request to a specific container running on the virtual compute system 110. Upon receiving such a request, an instance may be moved from the warming pool 130A to the active pool 140A and assigned to the user associated with the request. Then, the virtual compute system 110 can create a container on the instance, load the program code onto the container, and execute the program code in the container. Any information generated or obtained while executing the program code may be stored in one or more computing resources associated with the container. The computing resources may include local memory and/or disk storage accessible only by the container. The computing resources may also include a database that is maintained on the virtual compute system 110 or on an external service (e.g., auxiliary service 106). Upon storing the information generated or obtained while executing the program code in one or more computing resources, the routing manager 150 may update the mapping data 150A so that future requests that may benefit from utilizing the stored container-specific information would be routed to this specific container.

The routing manager 150 may utilize any known hashing schemes or other data structures to update and maintain the mapping data 150A. For example, the execution parameters included in the request may be hashed and mapped to the IDs of the containers. The mapping data 150A may include, for each program code execute on the virtual compute system 110, a table mapping various combinations of execution parameters to specific containers. The routing manager 150 may hash one or more of the execution parameters included in the request to determine a routing parameter, and use the routing parameter to determine a specific container to which the mapping data 150A maps the routing parameter. For example, if a first request requests execution of Function Foo with arguments "current temperature" and "90020," the routing manager 150 may route the first request to a first container, and if a second request requests execution of Function Foo with arguments "current temperature" and "10012," the routing manager 150 may route the second request to a second container. In another example, the requests may specify the name of the database that the requests are configured to manage or modify. In such an example, the database name may serve as the routing parameter that is mapped to specific containers (e.g., requests associated with database A mapped to container A, requests associated with database B mapped to containers B, C, and D, requests associated with databases C, D, and E mapped to container E, etc.).

In other embodiments, only a subset of the parameters are considered in generating the routing parameter. In such an example, each request associated with Function Foo and argument "current temperature" may be routed to the same container, regardless of other argument values. In yet another example, the mapping data 150A may provide that all requests associated with Function Foo are to be routed to a particular container. Although the example of routing to specific containers is used in some embodiments of the present disclosure, the techniques discussed herein may be applied to providing mapping data 150A that maps requests to particular instances, particular frontends, particular geographic locations, particular worker managers, etc. such that computing resources at the relevant level of granularity (e.g., instance-specific resources, account-specific resources, location-specific resources, etc.) may be utilized by the requests.

The mapping data 150A may be provided by the user, for example, via one or more UIs, CLIs, APIs, and/or other programmatic interfaces. The virtual compute system 110 may provide certain container information to the user, for example, when containers are created or terminated, so that the user can provide the mapping data with respect to specific containers. In some embodiments, the mapping data 150A may specify that a first group of requests (e.g., requests associated with Function Foo, requests containing a particular parameter specified by the user, requests receiving during certain hours, etc.) should be routed to one container and a second group of requests should be routed to another container. By providing an indication in the request that the request is to be handled using a specific container and/or by providing a mapping between parameter values (e.g., hash values) and specific containers, the user may control which requests are handled using which containers (and thus have access to which container-specific resources) and achieve reduced latencies associated with the requests by omitting costly operations using the container-specific resources (e.g., data locally stored within the container). The mapping data 150A may provide routing based on user account (e.g., requests associated with different user accounts routed to different containers), program code (e.g., requests associated with different program codes routed to different containers), time of day (e.g., requests received at different hours, days, months, years, etc. routed to different containers), geographic regions (e.g., requests associated with different geographic regions routed to different containers), function arguments (e.g., requests having different combinations of parameters or arguments routed to different containers), other request parameters or metadata, etc. In some embodiments, the portion of the mapping data 150A that would cause such requests to be routed to this specific container is deleted upon the termination of the container (e.g., due to lack of use).

Managing Backend Resources

In some embodiments, the routing manager 150 may monitor backend resources utilized in connection with incoming code execution requests. In some cases, third-party or user-owned resources (e.g., disk storage, database, network, etc.) may be used by program codes executed on the virtual compute system 110, and such resources may not scale as well as those managed by the virtual compute system 110 (e.g., handle large burst traffic), thereby creating an impedance mismatch. In such cases, the virtual compute system 110 may allow the users to specify the mapping between requests and containers such that the backend resources are utilized in a more controlled manner. For example, the mapping data 150A may provide that all requests utilizing a first backend resource should be routed to a first container, and all requests utilizing a second backend resource should be routed to any of a group of ten containers. In such an example, when a program code is being executed in the first container, the user can be sure that the program code is the only one accessing or managing the first backend resource and that the first backend resource is not overburdened by a large number of simultaneous requests.

User Customization of Compute Capacity

In some embodiments, the virtual compute system 110 may allow users to customize the instances that are used to handle their requests. For example, a user may specify, for example, via one or more UIs, CLIs, APIs, and/or other programmatic interfaces, that a specific version of the language runtime (or other software components) is provided on the instances servicing the code execution requests associated with the user. In response, the virtual compute system 110 may install the specified version of the language runtime when a new instance is assigned to the user such that any container created thereon can access the installed language runtime. In some embodiments, the routing manager 150 may update the mapping data 150A such that requests associated with the user are routed to one or more containers running on these customized instances so that, after the initial customization (and the associated latency hit), subsequent containers created on the customized instance can take advantage of the customization.

Frontend/Routing Manager Gossiping Routing Information

In some embodiments, the virtual compute system 110 may have multiple frontends 120 associated with different sets of warming pool managers 130 and worker managers 140. In such embodiments, the routing manager 150 may communicate with each of the frontends 120 to provide the routing information used to route incoming code execution requests to specific containers (or instances). In other embodiments, each frontend 120 may be associated with a different routing manager 150. In such embodiments, the frontends 120 and/or the routing managers 150 may gossip information to each other as soon as new routing information (e.g., mapping data 150A) becomes available so that incoming code execution requests can be routed to the appropriate containers. For example, as soon as one of the frontends 120 or the routing managers 150 obtains or determines new mapping information, the mapping information is shared with all of the frontends 120 or the routing managers 150 on the virtual compute system 110.

Account-, Instance-, Function-, and Container-Level Resources (11)

In some embodiments, the virtual compute system 110 maintains one or more computing resources at various levels. For example, the virtual compute system 110 may maintain one or more account-level resources (e.g., accessible by any code execution associated with the same account), one or more instance-level resources (e.g., accessible by any code execution on the same instance), one or more function-level resources (e.g., accessible by any code execution associated with the same function or program code), one or more container-level resources (e.g., accessible by any code execution in the same container), etc. The computing resources may include memory, disk storage, database, network, or any other resources that may be accessed during code execution.

External Services Controlling Container Lifecycle

In some embodiments, the virtual compute system 110 may allow third party services (e.g., application performance monitoring service, logging service, etc.) to exercise a certain amount of control over the lifecycle of the containers created on the virtual compute system 110. In some cases, these services may have the ability to ingest only at a specific rate or only a specific kind of data. In such cases, the virtual compute system 110 may allow these services to control the tempo at which the containers are created and/or terminated, for example, by allowing these services to perform one or more operations before/after containers are created or terminated. In one example, a logging service may perform certain logging operations at the end of a container's lifecycle to perform logging and cleanup operations. In another example, an external service may specify that only specific types of requests should be sent to the containers managed by the external service. In response, the routing manager 150 may update the mapping data 150A so that only the specified types of requests are routed to the containers managed by the external service.

Container Lifecycle Management

In some embodiments, the routing manager 150 may keep one or more containers alive by refraining from terminating them immediately or soon after code executions in the containers have been completed. For example, the routing manager 150 may cause certain containers to be kept alive even if the containers cannot be used to service any existing code execution requests. The decision of whether to keep such containers alive may be based on how frequently the requests that would be handled using the containers are expected to be received by the virtual compute system 110 and/or how much information has been stored in association with such containers in container-specific computing resources. The process of keeping the containers alive beyond their normal schedule is described in greater detail below with reference to FIG. 6.

Information Regarding Future Code Executions

In some embodiments, the routing manager 150 may maintain execution information regarding future code executions on the virtual compute system 110. For example, such information may provide that Function Y should be executed upon a successful execution of Function X, and that Function Z should be executed upon an unsuccessful execution of Function X. In such an example, the routing manager 150 may check the execution information after each attempted execution of program codes, to determine the next course of action. In another example, the routing manager 150 may maintain the execution information in one or more computing resources associated with the container in which the program code is executed, and check the execution information after a request has been routed to the container (e.g., just as the routing manager 150 would check the cached information to determine whether or how the program code should be executed).

Local Timer

In some embodiments, the routing manager 150 may maintain a local timer within individual containers. For example, a first container may maintain a local timer in a computing resource (e.g., memory, disk storage, etc.) associated with the first container, and any request routed to the first container may utilize the local timer for executing code in the first container. By maintaining a local timer that can be utilized by requests routed to the first container, the routing manager 150 eliminates the need to access certain external services (e.g., a scheduling service external to the virtual compute system 110) to monitor timing information (e.g., the requests can simply utilize the local timer), thereby achieving latency gains.

General Architecture of Routing Manager

Figure 2:
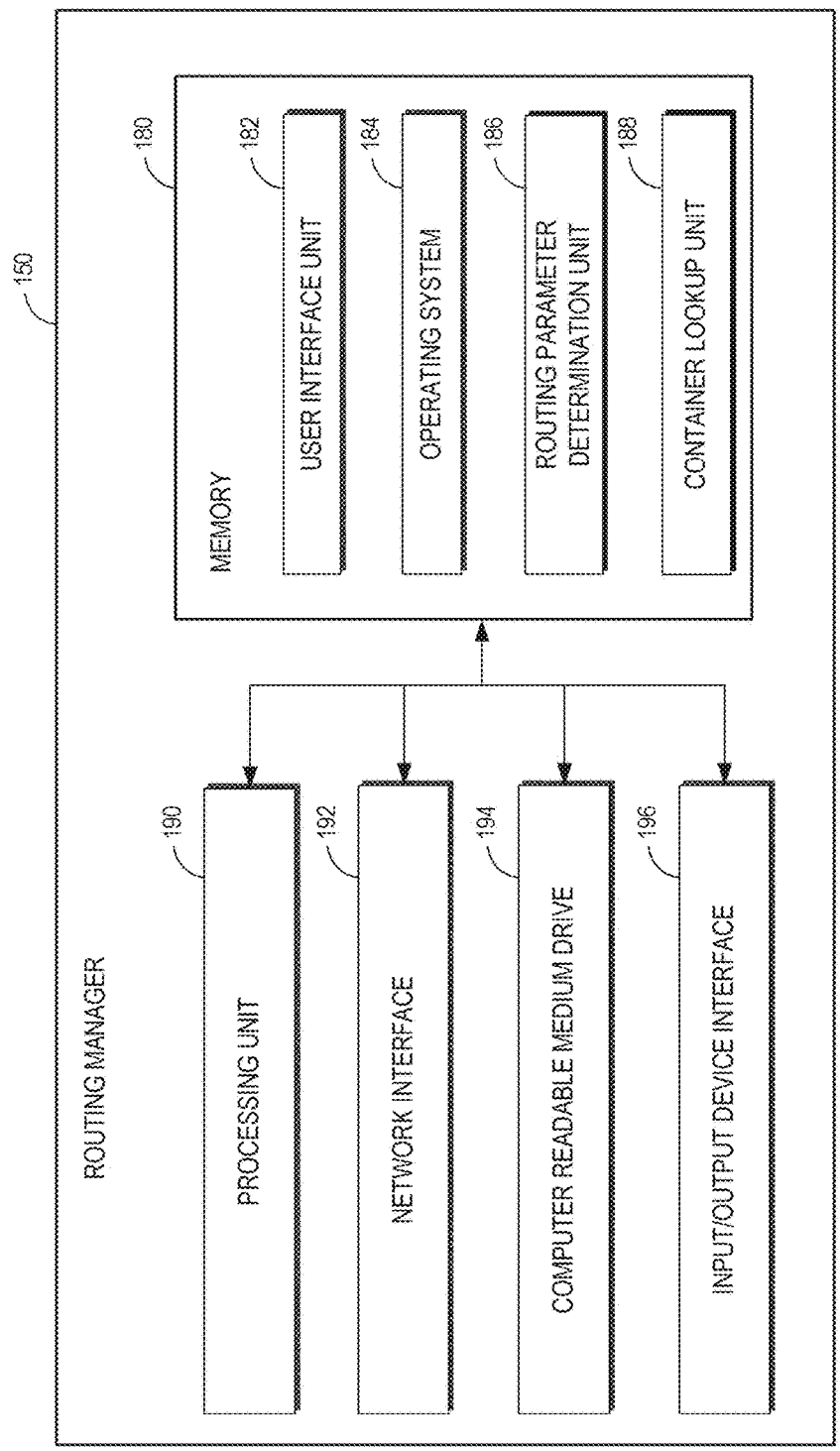
FIG. 2 depicts a general architecture of a computing device providing a routing manager for routing code execution requests, according to an example aspect.

FIG. 2 depicts a general architecture of a computing system (referenced as routing manager 150) that manages the virtual machine instances in the virtual compute system 110. The general architecture of the routing manager 150 depicted in FIG. 2 includes an arrangement of computer hardware and software modules that may be used to implement aspects of the present disclosure. The routing manager 150 may include many more (or fewer) elements than those shown in FIG. 2. It is not necessary, however, that all of these generally conventional elements be shown in order to provide an enabling disclosure. As illustrated, the routing manager 150 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the routing manager 150. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include a routing parameter determination unit 186 and a container lookup unit 188 that may be executed by the processing unit 190. In one embodiment, the user interface unit 182, routing parameter determination unit 186, and container lookup unit 188 individually or collectively implement various aspects of the present disclosure, e.g., maintaining routing information for routing requests to appropriate containers, processing incoming code execution requests, determining routing parameters associated with the requests, identifying containers to be used for handling the requests, etc. as described further below.

The routing parameter determination unit 186 determines a routing parameter associated with a given code execution request. For example, the routing parameter determination unit 186 processes the code execution request and extracts a routing parameter included in the request. Additionally or alternatively, the routing parameter determination unit 186 determines a routing parameter based on one or more of the account associated with the request, the program code associated with the request, the execution parameters included in the request, or other metadata associated with the request, such as the time of receipt, etc.

The container lookup unit 188 uses the determined routing parameter to look up the appropriate container to which the request should be routed. Any known hashing and/or lookup schemes may be used to associate routing parameters to specific containers and determine the appropriate container based on the routing parameter.

While the routing parameter determination unit 186 and the container lookup unit 188 are shown in FIG. 2 as part of the routing manager 150, in other embodiments, all or a portion of the routing parameter determination unit 186 and the container lookup unit 188 may be implemented, as a single unit, separate units, or in a distributed manner, by other components of the virtual compute system 110 and/or another computing device. For example, in certain embodiments of the present disclosure, another computing device in communication with the virtual compute system 110 may include several modules or components that operate similarly to the modules and components illustrated as part of the routing manager 150.

Example Routine for Routing Code Execution Requests

Figure 3:
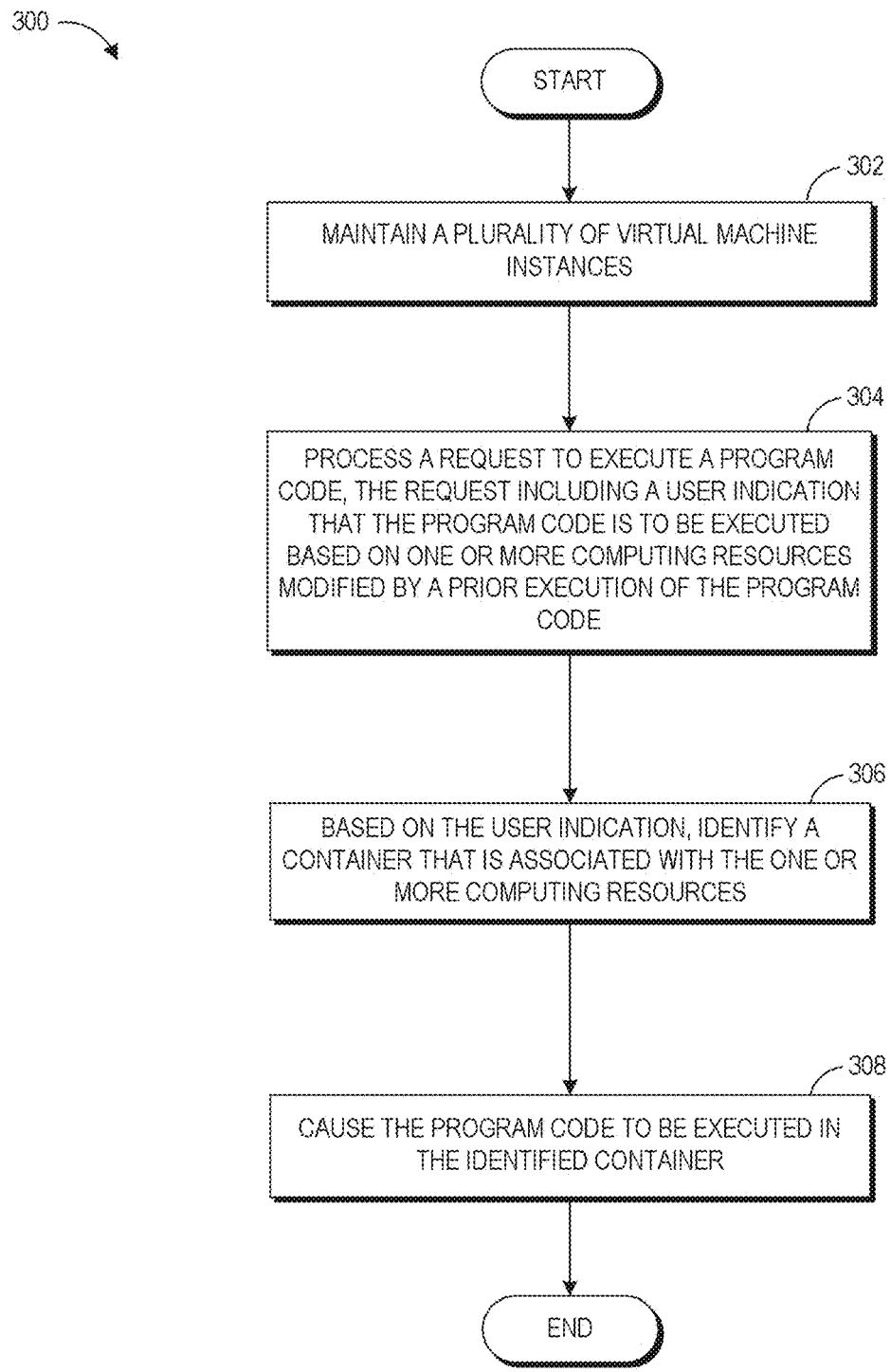
FIG. 3 is a flow diagram illustrating a code execution request routing routine implemented by a routing manager, according to an example aspect.

Turning now to FIG. 3, a routine 300 implemented by one or more components of the virtual compute system 110 (e.g., the routing manager 150) will be described. Although routine 300 is described with regard to implementation by the routing manager 150, one skilled in the relevant art will appreciate that alternative components may implement routine 300 or that one or more of the blocks may be implemented by a different component or in a distributed manner.

At block 302 of the illustrative routine 300, the routing manager 150 maintains a plurality of virtual machine instances. The plurality of virtual machine instances may include a warming pool (e.g., warming pool 130A) comprising virtual machine instances having one or more software components loaded thereon and waiting to be assigned to a user, and an active pool (e.g., active pool 140A) comprising virtual machine instances currently assigned to one or more users. The virtual machine instances in the active pool may have one or more containers created thereon for executing program codes therein.

At block 304, the routing manager 150 processes a request to execute a program code on the virtual compute system 110. The request may include a user indication that that the program code is to be executed based on one or more computing resources modified by a prior execution of the program code. For example, a prior execution of the program code may have caused certain data (e.g., key-value pairs stored in a database, function return values, etc.) to be retrieved (e.g., from an external database service in communication with the virtual compute system 110) or calculated and stored locally within the container in which the prior execution occurred, and any subsequent requests that may benefit from having access to the stored data or any subsequent requests that include user indications to use such stored data may be routed to the container in which the prior execution occurred so that the subsequent executions have access to the locally stored data. The request may also include user account information (e.g., identity of the account associated with a user), program code information (e.g., identity of the first program code to be executed) and one or more parameters (e.g., execution parameters, function arguments, etc.) to be used for executing the first program code.

At block 306, the routing manager 150 identifies, based on the user indication that that the program code is to be executed based on one or more computing resources modified by a prior execution of the program code, a container on a first virtual machine instance of the plurality of virtual machine instances that is associated with the one or more computing resources. For example, the routing manager 150 may calculate a hash value based on the user indication provided in the request, and perform a lookup of the hash value in a mapping table (e.g., mapping data 150A) maintained on the virtual compute system that maps hash values to specific containers. For example, the user indication (or the mapping data 150A maintained on the virtual compute system 110) may further provide that requests associated with the same parameters (e.g., zip code to be used to look up weather information) should be routed to the same container. Although the container is used as an example destination, the request or the mapping data 150A may indicate that the request should be routed to one of multiple containers or a group of containers.

At block 308, the routing manager 150 causes the program code to be executed in the container. In one example, the routing manager 150 (or another component of the virtual compute system 110 such as the worker manager 140) may determine whether a request of the same type has been processed in the container, and if so, determine whether one or more computer resources associated with the container contains information that can facilitate the execution of the program code. For example, prior execution results associated with the program code may have been stored in a memory associated with the container. In such a case, the current execution of the program code may output or return the prior execution results or omit certain computing operations (e.g., data retrieval, function invocation, data calculation, etc.) based on the availability of the prior execution results, thereby achieving a reduced latency.

While the routine 300 of FIG. 3 has been described above with reference to blocks 302-308, the embodiments described herein are not limited as such, and one or more blocks may be omitted, modified, or switched without departing from the spirit of the present disclosure.

Example Mapping Table

Figure 4:
FIG. 4 depicts an example mapping table illustrating the routing of requests to containers, according to an example aspect.

Turning now to FIG. 4, an example mapping table maintained either by the virtual compute system 110 or by an auxiliary service 106 of FIG. 1 will be described. As illustrated in FIG. 4, the table 400 includes incoming code execution requests labeled "Request A," "Request B," "Request C," and "Request D," each of which associated with a routing parameter and a container ID. For example, Request A has a routing parameter value of X and a container ID of 2, Request B has a routing parameter value of Y and a container ID of 7, Request C has a routing parameter value of C and a container ID of 2, and Request D has a routing parameter value of D and a container ID of 1. In the example of FIG. 4, it is assumed that Requests A-D are received by the virtual compute system 110 sequentially (e.g., A, then B, then C, and then D). The routing manager 150 may determine the routing parameter associated with Request A, either based on the routing parameter included in the request or based on the nature of the request (e.g., associated user account, function, etc.). The routing manager 150 determines the routing parameter of Request A to be "X" and identifies the container associated with the routing parameter X, which is the container having an ID value of 2. After Request A is processed, Request B is received and is routed to a container having an ID value of 7 based on the determined routing parameter value of "Y." When Request C is received, the routing manager 150 determines that Request C has the same routing parameter value has a previously handled Request A. According to the mapping table 400, Request C is also handled using the container having an ID value of 2, potentially achieving some latency gains if Request C is able to utilize information processed by Request A and stored in association with the container having the ID value of 2. Then, Request D is received and is routed to a container having an ID value of 1 based on the determined routing parameter value of "Z." In some embodiments, the routing parameter value may indicate the specific resources (e.g., resource ID identifying resources such as resources 158C and resources 159A-1 of FIG. 1) requested for executing the program codes. For example, requests requesting to use the same resource may be routed to the same container or the same group of containers.

The mapping table (or mapping data 150A) is not limited to the configuration shown in the example of FIG. 4, and may include any number of parameters that can be used for determining how the requests should be routed to which containers.

Example Routine for Caching Code Execution Results

Figure 5:
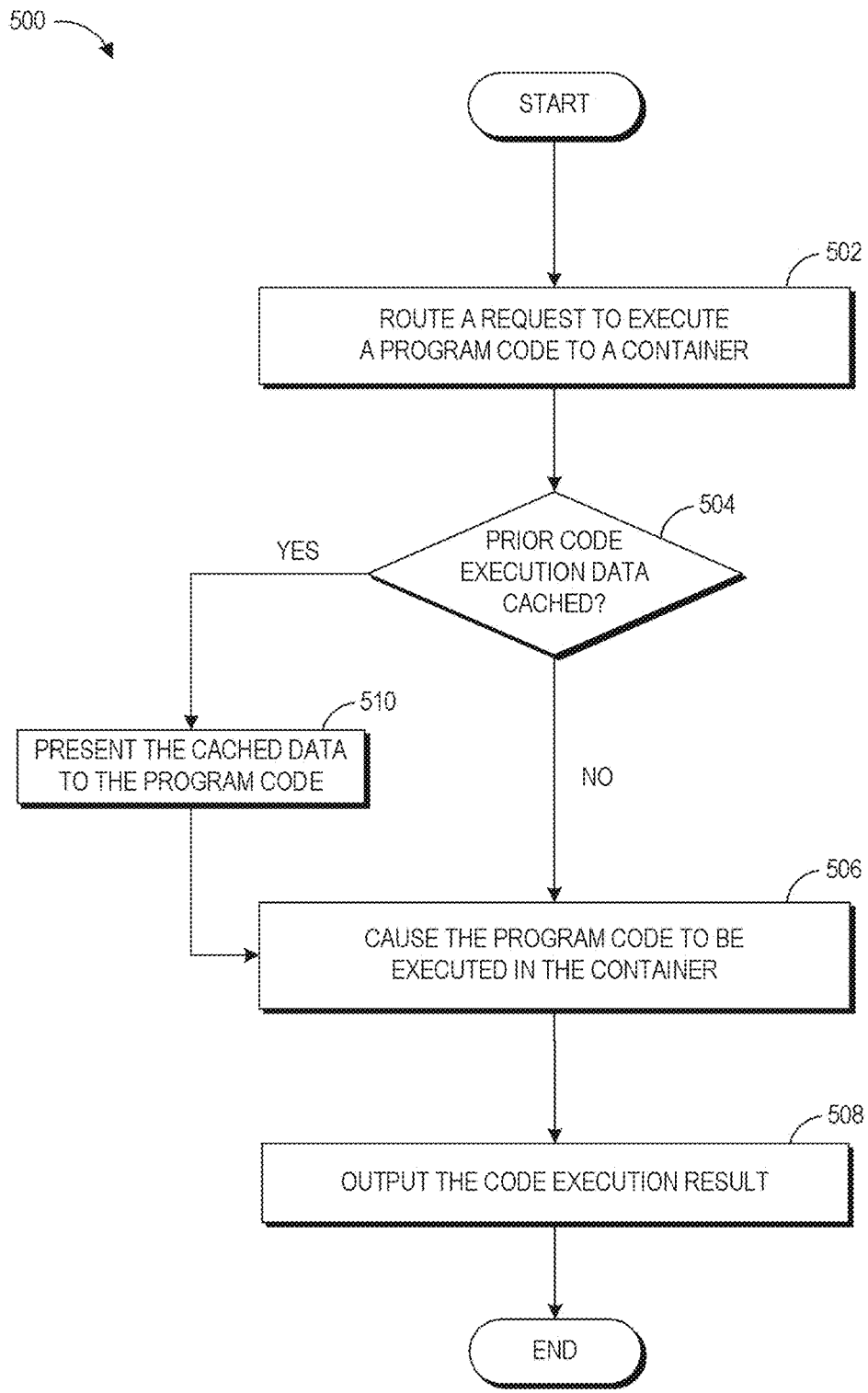
FIG. 5 is a flow diagram illustrating a code execution result caching routine implemented by a routing manager, according to an example aspect.

Turning now to FIG. 5, a routine 500 implemented by one or more components of the virtual compute system 110 (e.g., the routing manager 150) will be described. Although routine 500 is described with regard to implementation by the routing manager 150, one skilled in the relevant art will appreciate that alternative components may implement routine 500 or that one or more of the blocks may be implemented by a different component or in a distributed manner.

At block 502 of the illustrative routine 500, the routing manager 150 routes a request to execute a program code to a container. The container to which the request is routed may have been identified according to the routine 300 described with reference to FIG. 3.

At block 504, the routing manager 150 determines whether a prior code execution data that may be utilized by the request is available in one of the resources (e.g., memory, disk storage, database, etc.) associated with the container. In some examples, the routing manager 150 may determine whether the computing resources associated with the container contains any information available for use in connection with the current request (e.g., code execution results, or other data, determinations, and/or calculations). If the routing manager 150 determines that a prior code execution data that may be utilized by the request is available, the routine proceeds to block 510, where the prior code execution data is presented to the program code. Otherwise, the routine 500 proceeds to block 506.

At block 506, the routing manager 150 causes the program code to be executed in the container. The program code may be executed using one or more parameters included in the request. In some embodiments, the cached data presented to the program code causes the program code to start at a different state than the program code would have without the cached data. The program code may omit certain computing operations (such as data retrieval or calculations) based on the availability of the cached data. Once the code execution is finished, the routing manager 150 may store any information that may facilitate the processing of future requests of the same or similar type in one or more computing resources associated with the container. At block 508, the routing manager 150 outputs the code execution result obtained from executing the program code. In some cases, the outputted code execution result may be identical to the cached data presented to the program code at block 510. In other cases, the program code further processes or modifies the cached data to produce a code execution result that is different from the cached data.

While the routine 500 of FIG. 5 has been described above with reference to blocks 502-510, the embodiments described herein are not limited as such, and one or more blocks may be omitted, modified, or switched without departing from the spirit of the present disclosure.

Example Routine for Managing Container Lifecycle

Figure 6:
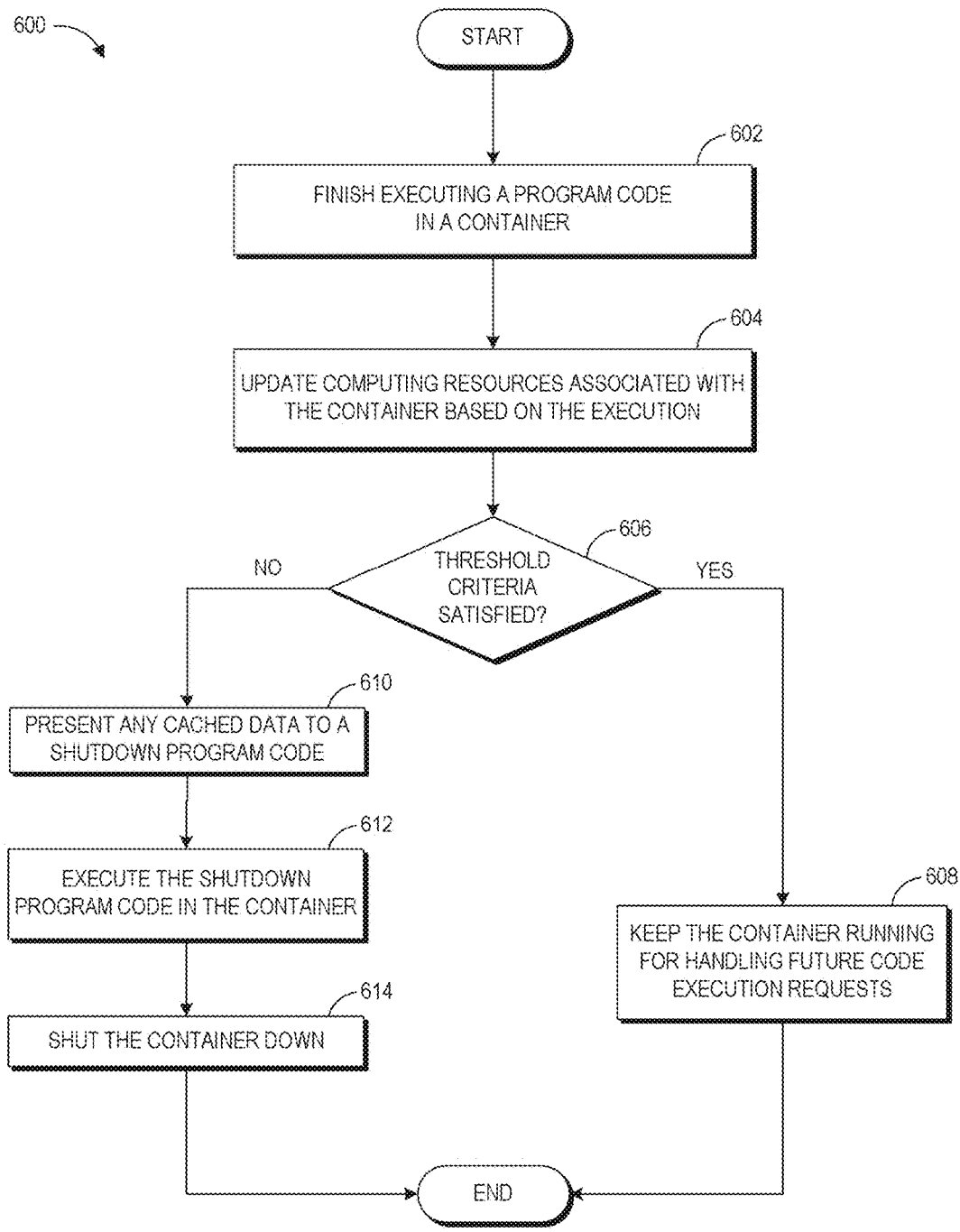
FIG. 6 is a flow diagram illustrating a container lifecycle management routine implemented by a routing manager, according to an example aspect.

Turning now to FIG. 6, a routine 600 implemented by one or more components of the virtual compute system 110 (e.g., the routing manager 150) will be described. Although routine 600 is described with regard to implementation by the routing manager 150, one skilled in the relevant art will appreciate that alternative components may implement routine 600 or that one or more of the blocks may be implemented by a different component or in a distributed manner.

At block 602 of the illustrative routine 600, the routing manager 150 finishes executing a program code on a container. At block 604, the routing manager 150 updates one or more computing resources associated with the container based on the finished execution. The updated computing resources may include information that may facilitate the processing of future requests of the same or similar type, as discussed with reference to FIG. 5.

At block 606, the routing manager 150 determines whether one or more threshold criteria for keeping a container alive are satisfied. In some cases, a container may not be immediately shut down even if the virtual compute system 110 does not have any request that can be handled using the container, in anticipation that such a request may shortly arrive and utilize the information stored in association with the container. In such cases, if the performance gain achieved by keeping the container alive and handling a future request using the container outweighs the cost of keeping the container alive, the routing manager 150 may choose to keep the container alive for an extended period of time beyond the normal schedule. The threshold criteria may include a threshold frequency level at which requests of the same type are received. For example, if a container has cached information that can be utilized by a large number in the near future (e.g., expected to be received at a greater frequency than the threshold frequency level), the routing manager 150 may keep the container alive. The threshold criteria may include a threshold size of the information stored in association with the container. If the container has a lot of information (e.g., greater than the threshold amount)

stored in a local memory or storage, the routing manager 150 may keep the container alive. If the routing manager 150 determines that the threshold criteria are not satisfied, the routine 600 proceeds to 610. Otherwise, the routine 600 proceeds to block 608.

At block 608, the routing manager 150 keeps the container running for handling future code execution requests. In some embodiments, the duration for which the containers are kept alive beyond their normal schedule is proportional to the size of the information stored in the containers or the frequency at which requests that would use the information stored in the containers are expected to be received. In other embodiments, the containers are kept alive for a fixed duration, and if the containers remain idle for the fixed duration, the containers are shut down.

At block 610, the routing manager 150 causes any cached data associated with the container to be presented to a shutdown program code (or shutdown hook) configured execute when the container is shut down. The shutdown program code may be used to perform any logging, monitoring, cleanup, or other operations associated with the container. At block 612, the routing manager 150 causes the shutdown program code to be executed in the container. At block 614, the routing manager 150 causes the container to be shut down. In some embodiments, the routing manager 150 may notify the container of the shutdown before the shutdown is performed, so that any data stored in the container-specific computing resources can be stored in permanent storage available even after shutting down the container.

While the routine 600 of FIG. 6 has been described above with reference to blocks 602-608, the embodiments described herein are not limited as such, and one or more blocks may be omitted, modified, or switched without departing from the spirit of the present disclosure. For example, in some embodiments, at block 614, the container is not shut down but instead reset or cleared.

Other Considerations

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system, comprising:
one or more processors; and
one or more memories, the one or more memories having stored thereon instructions, which, when executed by the one or more processors, configure the one or more processors to:
   maintain a plurality of virtual machine instances on one or more physical computing devices;
   in response to a first request to execute a program code, cause the program code to be executed in a container created on one of the plurality of virtual machine instances, the execution of the program code modifying one or more computing resources associated with the container;
   determine, based on an amount of information stored by the execution in response to the first request, that the container is not to be shut down for at least a period of time after completion of the execution in response to the first request;
   in response to the determination, refrain from shutting down the container prior to receiving a second request to execute the program code; and
   in response to the second request, cause the program code to be executed in the container using the one or more computing resources associated with the container.

2. The system of claim 1, wherein the one or more computing resources associated with the container include at least the information stored in the container by the execution in response to the first request.

3. The system of claim 1, wherein the instructions, when executed by the one or more processors, further configure the one or more processors to determine that the container is not to be shut down for a specific time period after completing the execution in response to the second request, wherein the specific time period is based on an amount of information stored by the execution in response to the second request.

4. The system of claim 1, wherein the instructions, when executed by the one or more processors, further configure the one or more processors to determine that the container is not to be shut down for a specific time period after completing the execution in response to the second request, wherein the specific time period is based on a frequency at which requests to execute the program code are received.

5. The system of claim 1, wherein the instructions, when executed by the one or more processors, further configure the one or more processors to determine that the container is not to be shut down for a predefined time period after completing the execution in response to the second request.

6. The system of claim 5, wherein the instructions, when executed by the one or more processors, further configure the one or more processors to cause the container to be shut down in response to not receiving another request to execute the program code for the predefined time period.

7. A computer-implemented method comprising:
maintaining a plurality of virtual machine instances on one or more physical computing devices;
in response to a first request to execute a program code, executing the program code in a container created on one of the plurality of virtual machine instances, the execution of the program code modifying one or more computing resources associated with the container;
determining, based on an amount of information stored by the execution in response to the first request, that the container is not to be shut down for at least a period of time after completion of the execution in response to the first request;
in response to the determination, refraining from shutting down the container prior to receiving a second request to execute the program code; and
in response to the second request, executing the program code in the container using the one or more computing resources associated with the container.

8. The method of claim 7, wherein the one or more computing resources associated with the container include at least the information stored in the container by the execution in response to the first request.

9. The method of claim 7, further comprising determining that the container is not to be shut down for a specific time period after completing the execution in response to the second request, wherein the specific time period is based on an amount of information stored by the execution in response to the second request.

10. The method of claim 7, further comprising determining that the container is not to be shut down for a specific time period after completing the execution in response to the second request, wherein the specific time period is based on a frequency at which requests to execute the program code are received.

11. The method of claim 7, further comprising determining that the container is not to be shut down for a predefined time period after completing the execution in response to the second request.

12. The method of claim 11, further comprising shutting down the container in response to not receiving another request to execute the program code for the predefined time period.

13. Non-transitory physical computer storage storing instructions, which, when executed by one or more processors, configure the one or more processors to:
maintain a plurality of virtual machine instances on one or more physical computing devices;
in response to a first request to execute a program code, cause the program code to be executed in a container created on one of the plurality of virtual machine instances, the execution of the program code modifying one or more computing resources associated with the container;
determine, based on an amount of information stored by the execution in response to the first request, that the container is not to be shut down for at least a period of time after completion of the execution in response to the first request;
in response to the determination, refrain from shutting down the container prior to receiving a second request to execute the program code; and
in response to the second request, cause the program code to be executed in the container using the one or more computing resources associated with the container.

14. The non-transitory physical computer storage of claim 13, wherein the one or more computing resources associated with the container include at least the information stored in the container by the execution in response to the first request.

15. The non-transitory physical computer storage of claim 13, wherein the instructions, when executed by the one or more processors, further configure the one or more processors to determine that the container is not to be shut down for a specific time period after completing the execution in response to the second request, wherein the specific time period is based on an amount of information stored by the execution in response to the second request.

16. The non-transitory physical computer storage of claim 13, wherein the instructions, when executed by the one or more processors, further configure the one or more processors to determine that the container is not to be shut down for a specific time period after completing the execution in response to the second request, wherein the specific time period is based on a frequency at which requests to execute the program code are received.

17. The non-transitory physical computer storage of claim 13, wherein the instructions, when executed by the one or more processors, further configure the one or more processors to:
determine that the container is not to be shut down for a predefined time period after completing the execution in response to the second request; and
cause the container to be shut down in response to not receiving another request to execute the program code for the predefined time period.

* * * * *